United States Patent

[11] 3,600,825

| [72] | Inventor | Peter J. Pearce<br>7657 Coldwater Canyon Ave., North Hollywood, Calif. 91605 |
|---|---|---|
| [21] | Appl. No. | 753,468 |
| [22] | Filed | Aug. 19, 1968 |
| [45] | Patented | Aug. 24, 1971 |

[54] SYNTHESIZED NATURAL GEOMETRIC STRUCTURES
10 Claims, 26 Drawing Figs.

[52] U.S. Cl. .................................................. 35/18 A, 46/29
[51] Int. Cl. ...................................................... G09b 23/26
[50] Field of Search.................................... 35/16, 18.5, 46 A; 46/26–29, 23, 31

[56] References Cited
UNITED STATES PATENTS

| 1,472,536 | 10/1923 | Thomson...................... | 35/18 UX |
| 1,851,159 | 3/1932 | Dodge........................... | 35/18 |
| 2,153,053 | 4/1939 | Smith............................ | 35/46 |
| 2,974,425 | 3/1961 | Dreiding....................... | 35/18 |
| 3,333,349 | 8/1967 | Brumlik......................... | 35/18 |
| 3,452,452 | 7/1969 | Dore.............................. | 35/18 |
| 3,452,989 | 7/1969 | Jernstrom..................... | 46/29 X |

FOREIGN PATENTS

| 982,792 | 1/1951 | France ........................ | 35/46 |
| 690,938 | 4/1953 | Great Britain................ | 35/18 A |

*Primary Examiner*—Harland S. Skogquist
*Attorney*—Golove & Kleinberg

ABSTRACT: The invention is an assembly, kit, or set of component parts for assembling, erecting or constructing geometric figures or shapes. The set of parts may take the form of a toy or it may be a set designed for purposes of research, scientific studies, mathematical displays and illustrations, architectural studies, etc. The parts include connectors (universal nodes); struts, bond links (coupling members); splices; face links (coupling members); and face or perimeter members. Preferably all parts or components are dimensionally coordinated and color coded so that the erection of forms or figures proceeds in accordance with predetermined patterns. Connectors or nodes include a universal node comprising a central member having spokes arranged in a predetermined array extending outwardly from the center along radii of a sphere. By means of the universal node and other parts (face members) there may be constructed a universal atom and various simulated molecular and other structures as well as geometric space-filling figures identified as nodal polyhedra.

PATENTED AUG24 1971 3,600,825
SHEET 1 OF 5
FIG. 1
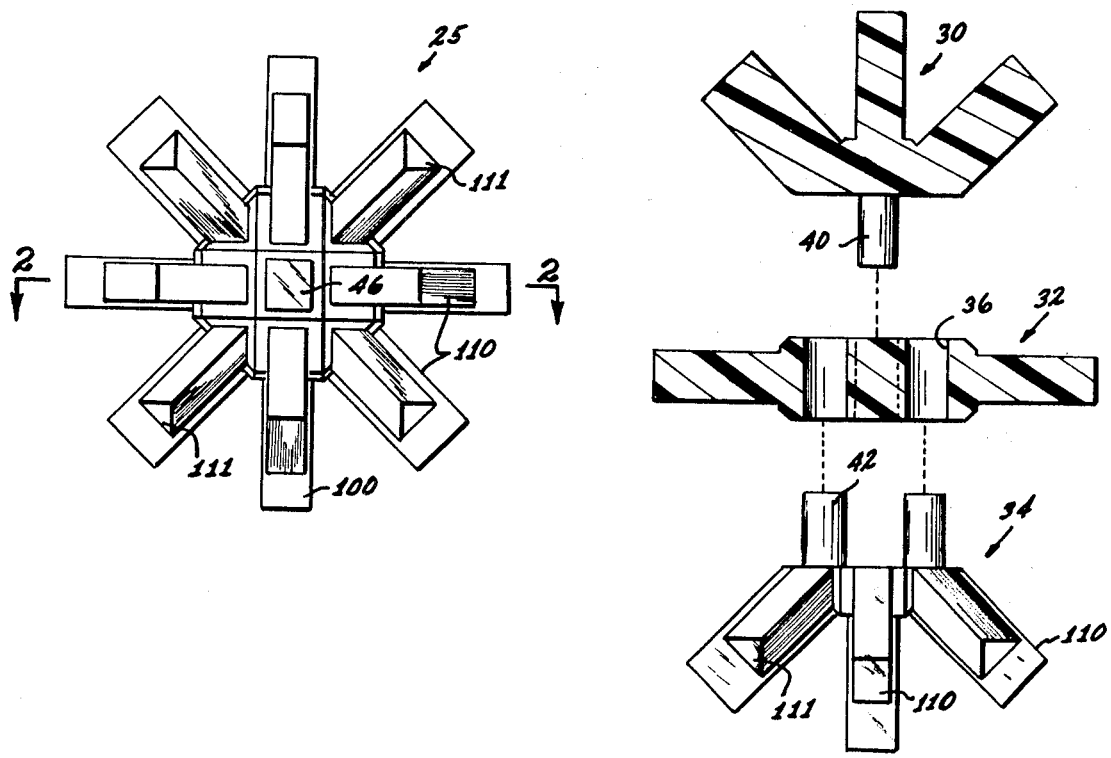
FIG. 2
FIG. 3
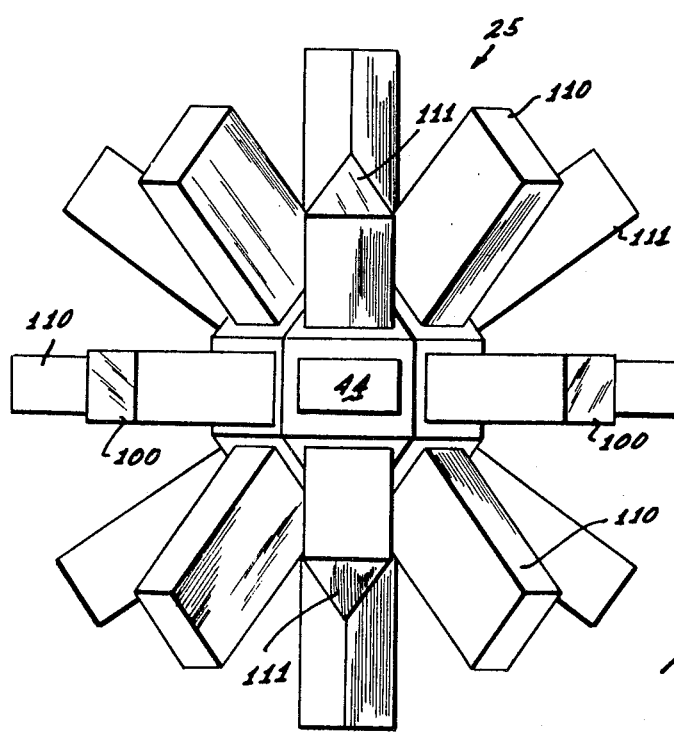
INVENTOR
PETER J. PEARCE
BY Denny T Walsh
ATTORNEYS

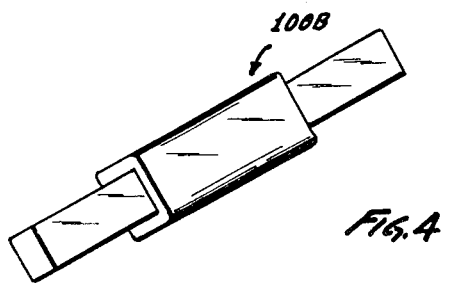
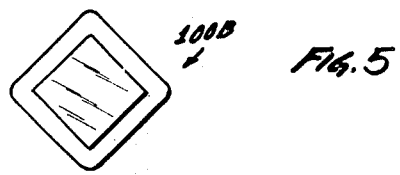
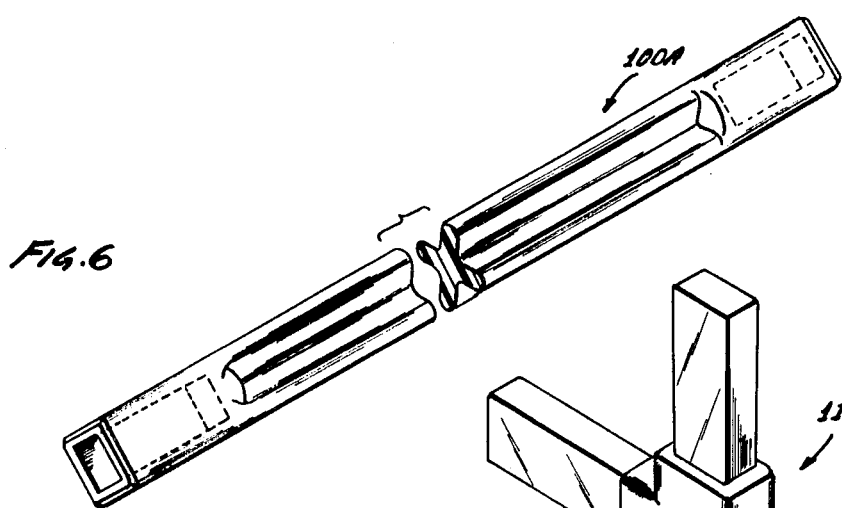
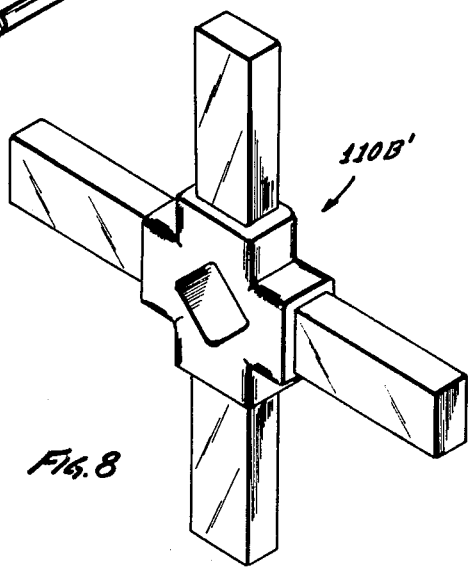
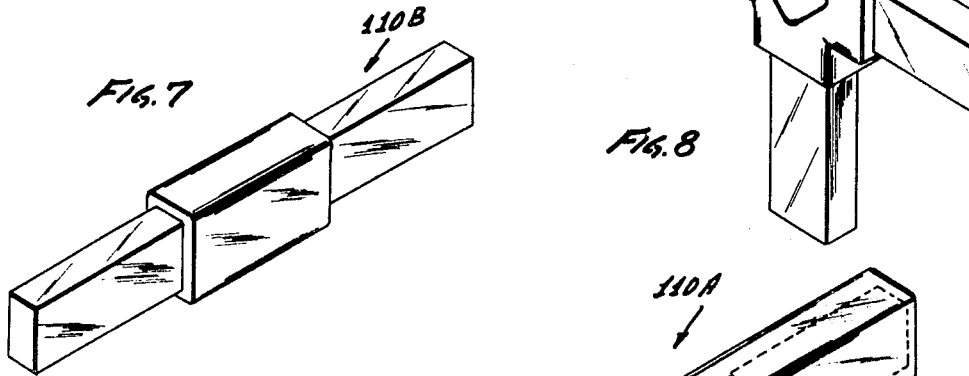
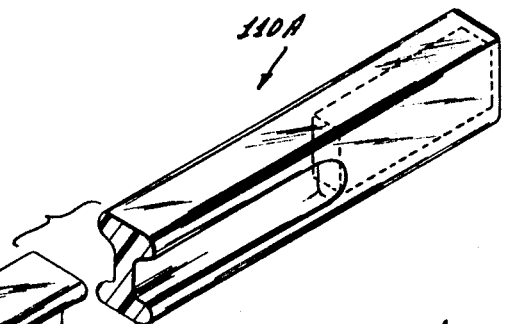
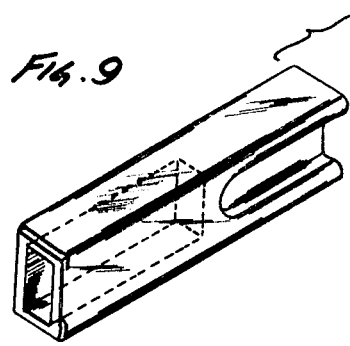

PATENTED AUG 24 1971 3,600,825

INVENTOR
PETER J. PEARCE

BY Herzig & Walsh
ATTORNEYS

INVENTOR
PETER J. PEARCE

BY Herzig & Walsh
ATTORNEYS

PATENTED AUG24 1971 3,600,825
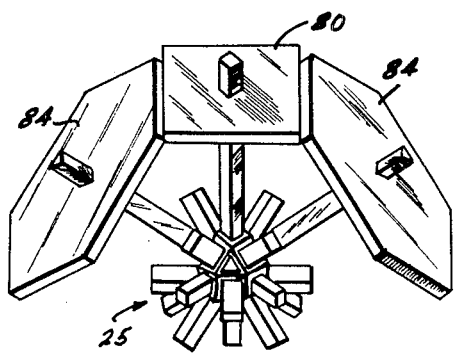
FIG. 23
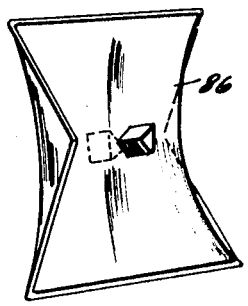
FIG. 24
FIG. 24A
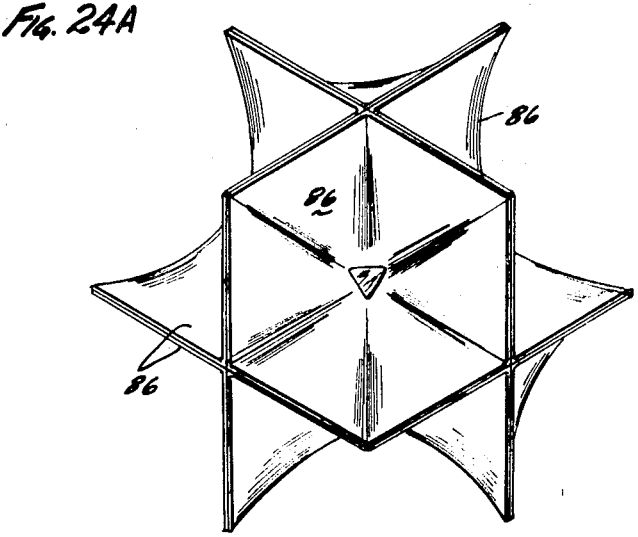
FIG. 25
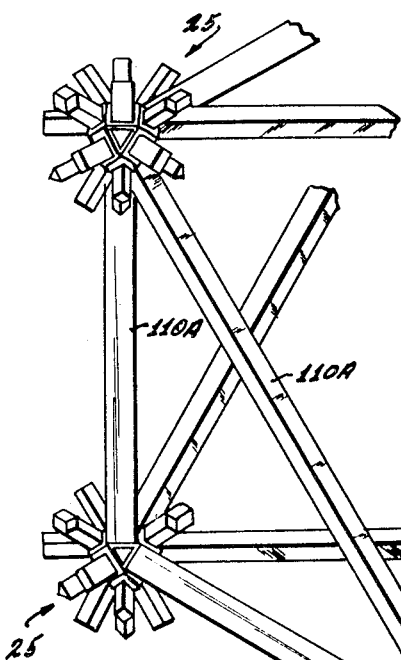
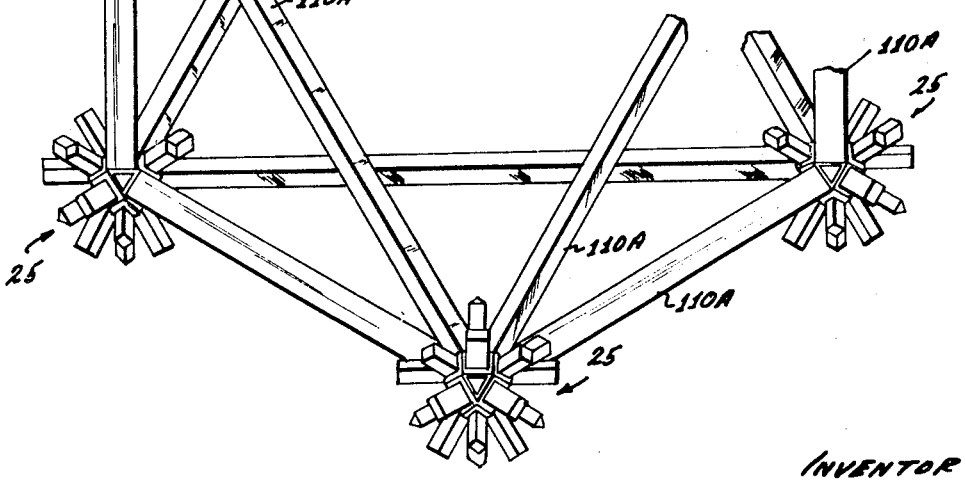
INVENTOR
PETER J. PEARCE
BY Herzig + Walsh
ATTORNEYS 3,600,825

SYNTHESIZED NATURAL GEOMETRIC STRUCTURES

SUMMARY OF THE INVENTION

This invention has its origin in and stems from the art and science of SYNESTURCTICS which is the subject of the volume by this title, being a study of universal structure, copyrighted in 1966 by the inventor herein. This is an art and science relating to the structure of materials in nature, both organic and inorganic, particularly, as to the characteristics of such structures, largely geometric, which are common or universal to essentially all of such materials. The herein invention involves the concept, the implementation thereof and practical application of construction materials and means for the construction and erection of geometric figures arrays and networks having utility in various areas including that of toys, teaching aids, demonstration models, tools for scientific research and display and unique forms of architecture as will become more clear as this description proceeds.

It has been discovered and observed that certain universal physical structural phenomena exist in nature's behavior which make no discrimination between the animate and inanimate, nor do such characteristic phenomena recognize scale. These universal characteristics show no favorites among the conventional disciplines with which we usually discuss natural phenomena, e.g. biology, chemistry, physics, etc. A remarkably universal approach to the structuring of bodies can be realized by applying those aspects of natural behavior which can be thus characterized as physico-geometric phenomena of characteristics.

One structural principle or characteristic, which is undoubtedly the most pervasive example throughout nature of physico-geometry, is usually referred to as "closest packing" and is a manifestation of nature's consistent tendency to do her structuring with a strategy of maximum economy. This principle might be referred to as nature's geometric economics. Examples of the principle of "closest packing" are abundant throughout all areas of scientific inquiry and range in scale from structures that can be easily seen with the naked eye, e.g. the bee's honey comb and soap bubbles, to those requiring powerful magnification, e.g. close-packed atoms in certain crystals.

There is another more illusive aspect of physico-geometric phenomena which relates to nature's ability to create vast numbers of form variants within the constraints of very simple systems. This aspect can be exemplified by a system consisting of a minimum inventory of fundamental component types which, by their very properties, permit great numbers of combinations and permutations, structurally, resulting is a plethora of alternative "structures." Although the above example is purely geometric, it is related to the way atoms combine and permute to create endless varieties of substances.

The herein invention applies and implements these characteristic phenomena to provide a design methodology making possible a new approach to the design of human shelters and settlements. The new approach of the herein invention has as an object to realize not only great economic advantages but also a range and variety of spatial and structural forms hitherto unknown in the history of architecture, even in recent times. A further object is to realize vast improvements for low cost housing, learning environments, community planning, and environmental structures for outer space and under sea use are considerable, from various standpoints such as economy, space saving, removal of limitations on use of materials, superior environments for human habitation, etc.

Another aspect of the invention is the conception and practical application of the saddle polyhedra—a synthesis of periodic networks and minimal surfaces constructed from the materials of the invention resulting in an entirely new class of mathematical figures, having intrinsic mathematical and crystallographic interest, and also making possible the implementation of the concept in improved structural applications.

Certain forms of the invention constitute specific building applications which demonstrate and apply the phenomena of structure in nature as the basis for the design and methodology of construction.

In the exemplary forms of the invention described in detail herein the materials provided for erection of the figures, networks, or assemblies comprise: struts; bonding links; splices; face links; universal nodes; and face or perimeter members, the nature of which will become apparent presently as well as the manner in which they are employed to achieve the foregoing objects. These parts or materials are all coordinated dimensionally and by color codings for purposes of realizing the desired objectives.

Specific improvements are embodied in the parts or materials having the purpose of realizing further objects including the following: to provide a connector, (universal node) having a plurality of radial, angularly spaced spokes of different cross section adapted to be connected to struts for forming three-dimensional figures.

Another object is to provide additional parts to be associated with the universal node for forming a figure identified as a universal atom, and other figures, namely, nodal polyhedra.

Further objects and additional advantages of the invention will become apparent from the following detailed description and annexed drawings wherein:

FIG. 1 is a view of the connector identified herein as a universal node;

FIG. 2 is an exploded view illustrating the manner of fabrication of the universal node;

FIG. 3 is a further view of the universal node;

FIG. 4 is a view of a splice used for joining struts of square cross section.

FIG. 5 is an end view of the splice of FIG. 4;

FIG. 6 is a perspective view of a form of strut having a square cross section.

FIG. 7 is a view of splice of rectangular cross-sectional configuration.

FIG. 8 is a view of a four-fold splice;

FIG. 9 is a view of another form of strut of rectangular cross section;

Figure 13:
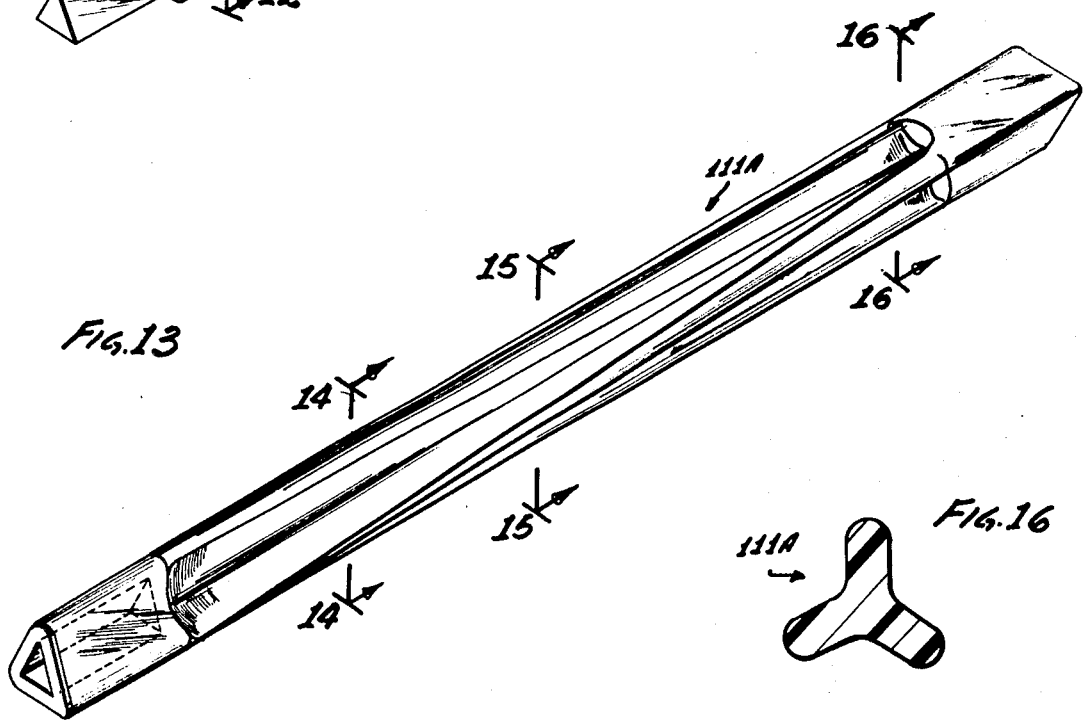
FIG. 13 is a perspective view of another form of strut illustrating its different cross sections along its length.
Figure 16:
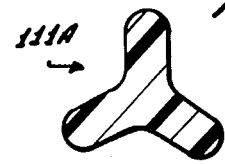
Figure 15:
Figure 14:
Figure 17:
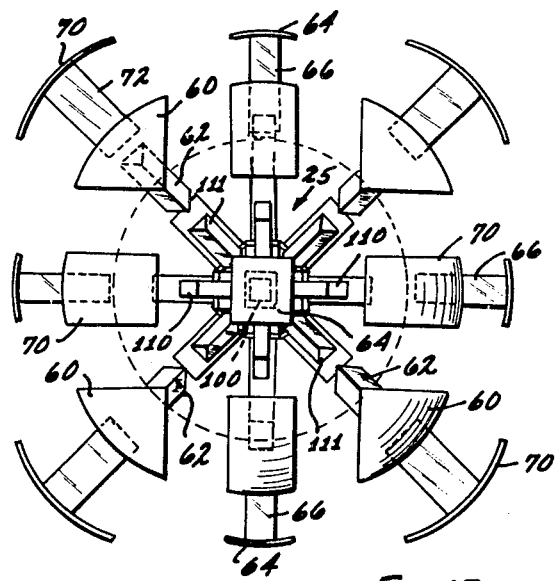
Figure 18:
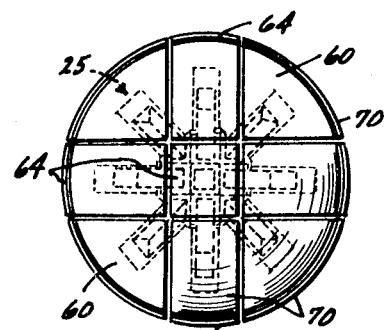
Figure 20:
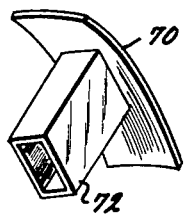
Figure 19:
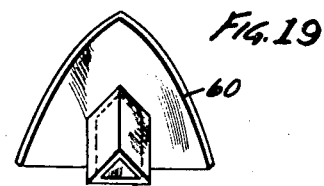
Figure 21:
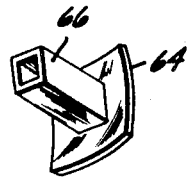
Figure 22:
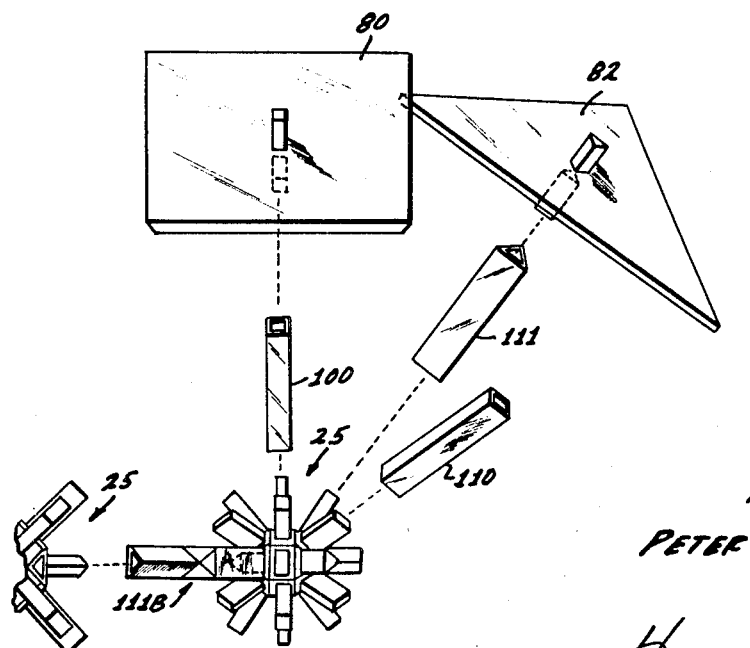

FIGS. 14, 15, and 16 are cross-sectional views taken along the lines 14—14, 15—15 and 16—16 of FIG. 13;

FIG. 17 is an illustrative view of a universal atom assembled from a universal node and additional parts;

FIG. 18 is a fully assembled view of the parts shown in 17 forming a sphere;

FIGS. 19, 20, and 21 are views of members used in assembling the universal atom;

FIG. 22 is an exploded view illustrating the utilization of the universal node in assembling nodal polyhedra;

FIG. 23 is a partial view further illustrating the assembly of nodal polyhedra of another form;

FIG. 24 is a perspective view of a saddle hexagon;

FIG. 24 is a partial perspective view of a saddle octahedron formed from a universal node and saddle hexagons'; and FIG. 25 is a view of a geometrical figure assembled from the universal nodes and struts.

THE UNIVERSAL NODE AND THE UNIVERSAL ATOM

The Universal Node 25 as shown in FIGS. 1–3, has 26 spokes radiating outwardly in multidirections from a common center. In a preferred form as shown these spokes are all of equal radii, consistent with a generally spherical form. Of the 26 spokes, 6 have square cross sections, 8 have triangular cross sections, and 12 have rectangular cross sections.

The universal node is injection molded in three parts, 30, 32, and 34 as shown in FIG. 2. These are injected molded parts or components and are designed for press fit assembly. FIG. 2 illustrates the manner of assembly. It is formed in three components to facilitate the molding since the node itself could not be molded in one piece. The components 30 and 34 are alike; component 32 has eight spokes and each of components 30 and 34 has nine spokes extending at angles as shown. The component 32 has four small axial apertures as designated at 36 and the components 30 and 34 have each a pair of extending prongs or projections as shown at 40 and 42 which are received in the apertures to snugly hold the parts together. The component 32 has two oppositely or diametrically opposed square spokes identified by the code 100. It has another pair of oppositely disposed square spokes identified by the code number 100 and has two pair of oppositely disposed rectangular spokes 110. The angularly arranged spokes on the components 30 and 34 are alternately rectangular, and triangular in cross section with one axial spoke which is square in cross section.

When the components are assembled a multidirectional system is created which is bounded by 12 rectangular spokes positioned on 12 rectangular faces and 8 triangular spokes positioned on 8 triangular faces, and 6 square faces, the X, Y, Z coordinates (Miller Indices) for the axis directions of these spokes are respectively identified by the code numbers 110, 111 and 100; the result is a 26 spoke system having 13 axes of rotational symmetry, as shown in FIGS. 1 to 3. The rectangular and triangular faces in components 30 and 34 are truncated in order to avoid undercuts in the mold. The remaining piece of each face is molded integral to components 32. Thus, the node has the following characteristics: six square spokes of fourfold symmetry in the 100 directions; eight triangular spokes of threefold symmetry in the 111 directions; and 12 rectangular spokes of twofold symmetry in the 110 directions.

From the foregoing it will be understood that the component 32 has eight spokes 45° apart including four square spokes and four rectangular spokes spaced alternately. In FIG. 3 component 32 lies in a plane normal to the paper. This figure represents the twofold axis of symmetry, numeral 44 being the rectangular end face of a spoke. This is the 110 direction perpendicular to the dodecahedron plane.

Each of the components 30 and 34 has eight spokes 45° apart with reference to the central axis of component 32. These spokes include four triangular spokes 90° apart; and four rectangular spokes uniformly spaced between the triangular spokes. FIG. 1 illustrates the fourfold axis of symmetry, (i.e.) the 100 directions perpendicular to the cube plane. Thus numeral 46 is the end face of a square spoke in FIG. 1. The threefold axis of symmetry would be represented by a figure similar to FIGS. 1 and 3 with the triangular end face of a spoke appearing in the position of the end faces 44 and 46. The threefold axis of symmetry is in the 111 directions perpendicular to the octahedral plane.

All spokes are dimensioned to be coordinated with the other components of the system and in the exemplary form of the invention the centers of the ends of all spokes fall on a common sphere and by way of example this might have a diameter of 1 1250 inches.

FIG. 9 shows the 110A strut which constitutes the twofold strut for use with the universal node. In this set of three strut types 100A, 110A, and 111A, the 110A strut is considered as unity. The lengths of all other struts are determined with respect to unity. In this instance unity will equal 6 inches. Six inches minus the diameter of the universal node on its 110A axis (0.448 inch diameter) equals 5.552 inches. The color of the 110A strut in the exemplary form of the invention is red FIGS. 6, 9 and 13 illustrate three forms of struts identified by the numerals 100A, 110A and 111A. 100A strut as shown has square end sockets and constitutes the four-fold strut for use with the universal node. Its length is derived by the following formula, $-A\sqrt{\frac{2}{2}}-D(100)$ where A equals unity (6 inches) and D(100) equals diameter of the universal node on its (100) axis. D(100) equals 0.4752 inch in this particular example.

The color code for the 100A strut is orange. Its cross section along its length is that shown in FIG. 6.

FIGS. 13 through 16 illustrate the 111A strut. This strut constitutes the threefold strut required for use with the universal node. It has a triangular end sockets and these end sockets have a 60° angular twist relative to each other about the longitudinal axis of the strut. This angular twist causes the cross section along the length of the strut to vary as indicated in FIGS. 14, 15 and 16 which are cross sections taken along the lines 14—14; 15—15 and 16—16. Its length is derived by the following formula: $-A\sqrt{\frac{6}{4}}-D(111)$, where A equals unity (equals 6 inches) and D(111) equals diameter of universal node on the appropriate axis which in this case is the 111A axis that is equal to 0.45720 inch. Color coding is an essential part of this model system, each component necessarily being a different color, yellow being the color for the 111A strut in the exemplary form of the invention.

Figure 10:
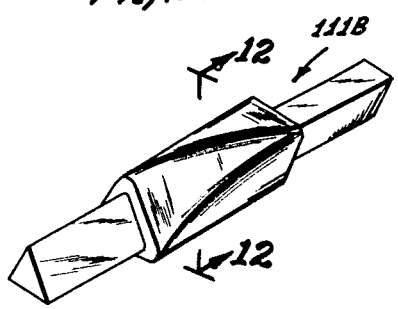
FIG. 10 is a perspective view of a splice of triangular cross section.
Figure 11:
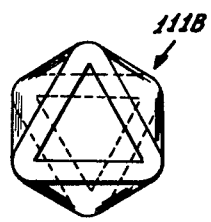
FIG. 11 is an illustrative view illustrating a twist in the splice of FIG. 10.
Figure 12:
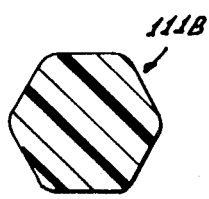
FIG. 12 is a sectional view of the splice of FIG. 10.

There are provided four forms of splices as shown in FIGS. 4, 7, 8 and 10. These splices are identified as follows: FIG. 4 is the 100B splice; FIG. 7 is the 110B splice; FIG. 8 (four-fold splice) is identified 110B' splice and FIG. 10 shows the 111B splice.

The 100B, 110B and 111B splices are linear splices and the 110B' splice is a four-fold splice. The three linear splices correspond to each of the three struts 100A, 110A and 111A of the universal mode and are used to assemble struts of compound lengths. The single four-fold splice is used with the 110A struts only. Each splice component is to be molded in the same color as its corresponding strut and consequently may be in the same mold as the strut. There is a ratio of two struts per each linear splice molded and four struts for each four-fold splice molded.

The universal mode is a star like rigid molded or fabricated device which has spokes of various cross-sectional types radiating out in multidirection from a common center. It combines in one system the axes of the three most fundamental and symmetric mathematical relationships that are possible in three dimensional space. These include the three axes of the 90° cubic directions having a four-fold rotational symmetry, the four axes of the 70° 32 minute octahedral directions having a threefold rotational symmetry, and the six axes of the 60° dodecahedral directions having a twofold rotational symmetry. In crystallographic notation, these 13 axes have the following coordinates (Miller Indices): cubic [100], octahedral [111], and dodecahedral [110].

These 13 multidirectional axes give rise to a nodal coordination of 26, and, therefore, the universal node has 26 spokes radially disposed about a common center. The fundamental principle of the universal node is that each spoke has a cross-sectional shape which corresponds to the symmetry of the node on the axis upon which any given spoke falls, e.g. the fourfold axes have spokes of square cross section, the threefold axes have spokes of triangular cross section, and the twofold axes have spokes of rectangular cross section.

For each of the three spoke types there is lower corresponding strut type having sockets in each of its ends which just fits over the proper spoke. The strut is held on to the spoke by friction. The three strut types are of coordinated lengths and it is preferable that their respective cross sections reflect the symmetry of the axes they represent. The threefold [111] strut has a special requirement which the other two do not have. Namely, that a 60° longitudinal twist is necessary for it to function properly. A non twisted threefold strut is a useful option but represents a system of lower symmetry so is not a fundamental part of the universal node system. It is of more than passing usefulness so is a desirable option as it facilitates the use of multiple strut lengths.

Because of the multidirectional coordination of the universal node, it is possible to assemble a structure such that all the most symmetrical possible fundamental three dimensional relationships exist in a single construct, thereby establishing a universal periodic network as the fundamental "set." This fundamental set has a primary array of nodes in which 26 struts meet and a secondary array of nodes where are merely the result of three struts crossing. This universal node system reveals the interrelationship of a great variety of orderly structures which are simply "subsets" of the universal net. It becomes a powerful tool for coordinating seemingly diverse relationships found in geometrics. It can be used at many age levels and for many purposes. Young children may use it as a construction toy or as a tool for the study of structure in nature in a learning environment setting, and scientists, designers, engineers and mathematicians may use if for building research and demonstration models to illustrate various structural and mathematical concepts.

Because the cross-sectional shapes of the struts corresponds to the shapes (symmetries) of their respective axes it is impossible for the child to assemble subtle and seemingly complex arrays incorrectly. That is, it is impossible to assemble a periodic array in which the universal node is incorrectly oriented. This means that whenever any periodic structure is constructed each node is always properly oriented with respect to the three fundamental coordinate systems. If a child, for example, assembles a network, the nodes of which are representative of the arrangement of atoms in diamond structures he will immediately see how this diamond structure relates geometrically to 90 or 60° coordinates and will see immediately that the diamond is simply a subset of the octahedral axes. The universal node concept is a new system created in the class of systems using rigid joiners and struts for three dimensional constructions. It uses multidirectional coordinates of assembly possibilities unprecedented for such devices, and provides an extraordinary range of assembly possibilities.

It is possible to create three spherical polygon types corresponding to each spoke type of the universal node, each of which is molded or fabricated in such a way that a special spoke socket protrudes from the concave side. FIG. 19 shows a spherical triangle 60 having a spoke socket 62 that fits over the triangle spoke of the universal node; FIG. 21 shows a spherical square 64 which has a spoke socket 66 that fits over the square spoke of the universal node; and FIG. 20 shows a spherical rectangle 70 which has a spoke socket 72 that fits the rectangular spoke of the universal node.

When a complete set of spherical polygons are attached to the universal node a true sphere results. FIG. 17 is an exploded or preassembled view of such a set of spherical polygons and a universal node and FIG. 18 shows the set assembled into a sphere. The assembled sphere reveals six lesser circles of common radius, which are the arc boundaries of great circle arc segments on a sphere, however, in this case the lesser circle boundaries are preferable.

The structural relationships that are revealed through use of the universal node with its three basic struts are equivalent to certain relationships demonstrated with three dimensional packings of identical spheres. The sphere created around the universal node may be considered as a universal atom and can be used to construct a great many different molecular and structural models. Two or more universal atoms may be joined to each other on any of the three axes of the universal node by removing certain spherical polygons on the common axis of contiguous spheres and by substituting joining members which are called "bonds" or bond links.

There are provided three types of bond links corresponding to the three spoke types of the universal node, e.g. a fourfold (100) bond link; a twofold (110) bond link; and a threefold (111) bond link. These links are the same in configuration as the face links 100, 110, and 111 shown in FIG. 22 except as to length. The lengths of these bonds links are determined so that the distance from the center of a neighboring sphere is exactly the diameter of the sphere. The universal node based sphere can be considered a universal atom to the extent that it accounts for all of the most symmetrical possible "bond" angle directions which can appear in a periodic array of spheres packed together—in both dense close packed arrangements and in less dense open packings. It is well known that many chemical substances have their constituent atoms organized in orderly arrays corresponding to a number of alternative ways in which identical spheres can be associated.

In the universal atom system both the spherical polygons and the bond links correspond in color to their respective components in the universal node system. Therefore, the spherical triangle, the (111) bond link, the (111A) strut, and the (111B) splice (see drawings) are all yellow; the spherical rectangle, the (110) bond link, the (110A) strut, the (110B) splice, and the (110) four-fold splice are all red; and the spherical square, the (100) bond link, the (100A) strut, and the (100B) splice are all orange. The universal node itself is generally preferred to be white or other basically neutral colors. Each spoke of the universal node is preferably color coded to match the components that fit on it, although this may be prohibitive due to costs and hence omitted. Although this consistent color coding is not necessary for the physical functioning of this material, it is a fundamental part of the system, as it greatly increases the ease and efficiency with which complex and subtle relationships may be perceived.

This comprehensive set of components may be used in the following fundamental combinations:
A. Universal node with struts (and splices).
B. Universal node with bond links.
C. Universal atom with struts (and splices).
D. Universal Atom with bond links.

NODAL POLYHEDRA

A finite polygon can be defined as a surface, flat or warped, bonded (or defined) by a closed circuit of straight line segments. Such a surface is considered to be the minimal area which will join all edges of the circuit. The more common variety of polygon is flat and is referred to as a plane polygon, e.g. triangle square, pentagon, hexagon, rhombus, etc. The warped polygon is referred to as a saddle polygon, e.g. saddle tetragon, saddle hexagon, saddle octagon, etc. A rectangular polygon is any polygon, plane or saddle, which is equilateral and equiangular. FIGS. 24 and 24A show saddle polygons 86.

Any closed figure which is bounded by polygons may be called a finite polyhedron. The polygons are referred to as the faces of the polyhedron. A regular polyhedron is any polyhedron which bounded exclusively by one type of regular face, and in which all of its vertices are congruent. The classic polyhedron is bounded by plane faces and may be called a flat polyhedron. This invention includes the discovery of a new kind of polyhedron which is bounded by saddle polygons and which is called the saddle polyhedron, and the practical application and implementation of the discovery in structures having practical utility. The saddle polyhedron is shown in FIG. 24A.

For every periodic three dimensional network which can be constructed with the universal node system it is possible to define geometrically a reciprocal network. The geometric edges of this reciprocal network define polyhedra of various types which can be described as Nodal Polyhedra. These Nodal Polyhedra are space filling figures which characterize the coordination of the universal node or any subset of the node. Coordination here refers to the number of struts that emanate from any given node in an array. The Nodal Polyhedron will have the same number of faces as there are struts emanating from the universal node. The struts usually pass through the center of the faces and are perpendicular to the faces.

For example: The Universal Network which has an array of primary nodes of coordination equal to 26 and an array of secondary nodes of coordination equal to 6, defines as its reciprocal a space-filling array of two kinds of polyhedra: a 26-faced figure with six saddle dodecagons, 12 saddle hexagons, and eight plane hexagons; and a six-faced figure with two saddle dodecagons and four saddle hexagons. The universal network can be readily visualized from FIG. 25.

There are a great many structural networks which can be considered subsets of the Universal Network. It is useful to consider the reciprocals of some of the more uniform networks. If, for example, the (100A) struts are attached to the six (100) square spokes of each universal node in a periodic array, these struts define the edge of cubes. This simple cubic array has as its reciprocal another simple cubic array, therefore, the Nodal Polyhedron of the simple cubic array is a cube.

If the (110A) rectangular struts are attached to the 12 (110) rectangular spokes of the universal node in a periodic array, these struts define the edges of an array of tetrahedra and octahedra. Each universal node has a subset coordination of 12 and the Nodal Polyhedron is bounded by 12 rhombuses and is called the rhombic dodecahedron.

If a structure is assembled with the Universal Node in which (111A) struts (attached to the (111) triangular spokes of the node) form the edges of an array of rhombic dodecahedra it is found that the Universal Node appears in two different subset forms; for each node of coordination equal to eight in an array there are two nodes of coordination equal to 4. This suggests that there are two kinds of Nodal Polyhedra. It has been just previously mentioned that the Rhombic dodecahedra and the tetrahedra/octahedra array are reciprocal to one another. It follows from this that the array of rhombic dodecahedra has both tetrahedra and octahedra in the ratio of 2 to 1 as Nodal Polyhedra.

When (111A) struts are attached to all eight of the (111) triangular spokes in an array of Universal Nodes a structure is created which defines a saddle polyhedron having 4 saddle tetragon faces—a saddle tetrahedron. The Nodal Polyhedron must also be a saddle polyhedron and because every Universal Node in the array has a coordination of 8, the Nodal Polyhedron must have eight faces. This—a saddle octahedron—is bounded by 8 saddle hexagon faces having equal edges and included angles of 90° (face angles).

With these examples in mind, the form of the invention illustrated in FIGS. 22—24 will be understood which is a system of model construction in which Nodal Polyhedra are assembled around the Universal Node. It consists of a series of molded or formed polygons such as shown at 80, 82 and 84, with short spokes emanating from each side of the face—usually from the face center. Any given face will have spokes with cross section shapes similar to one of the 3 spoke shapes of the Universal Node, i.e. square, triangular, or rectangular as illustrated in FIGS. 22 and 23. In addition to these faces, face links are provided which are used to attach the faces to the Universal Node as illustrated at 100, 110, and 111 in FIG. 22. There is a series of face links corresponding in cross section and relative length ratios, to the three struts of the Universal Node previously described. In the preferred form of the invention these face links are color coded to correspond to the colors of the struts of the Universal Node and the bond links of the Universal Atom as previously described. With sockets in each of its ends a face link fits over its corresponding spoke on the Universal Node with one end, and the other attaches to the spoke on a given face. FIG. 24 shows a saddle hexagon 86 and FIG. 24A shows a saddle octahedron formed or bounded by 8 saddle hexagons erected in accordance with the principles expounded herein.

It is usually preferable that the faces be transparent, although it is also useful to have opaque faces for some special purposes. The more common faces that may be used have equal edges on their sides. These edges will have a precise geometric correspondence to one of the three basic struts of the Universal Node, therefore, it is also possible to color code the faces. If the face is transparent it can be tinted to correspond to the particular strut it is related to.

A variation on this system is possible in which the face link is molded integral with the face. When this is done the face link is the same color as the face. However, this limitation on the color coding does not prevent the proper use of this material, as its basic capability depends upon the physical and geometrical relationships which are built into the system.

The Nodal Polyhedra system is an important complement to the Universal Node and the Universal Atom Systems. It joins into one comprehensive relationship the concepts of three dimensional periodic networks, space filling polyhedra, and reciprocity; it demonstrates the fundamental validity of the discovery of the saddle polyhedra, and implements the practical application and usefulness of it.

From the foregoing those skilled in the art will understand the nature, construction, and usage of the invention and the manner in which it realizes all of the objects set forth in the foregoing.

The foregoing disclosure is representative of preferred forms of the invention and is to be interpreted in an illustrative rather than a limiting sense the invention to be accorded the full scope of the claims appended hereto.

1. In a kit of parts for erecting figures, in combination, a universal node comprising: a connector in the form of a member having a center; a plurality of spokes of differentiated cross sections lying angularly spaced from each other extending from said center along radii of a sphere, said spokes of similar cross section being oriented to establish predetermined axes of symmetry corresponding to predetermined geometrical shapes that can be erected with a plurality of said nodes at the vertices thereof, each spoke having a cross section corresponding in symmetry to the predetermined axis of symmetry established thereby; node-coupling means for coupling spokes of a first node to the corresponding spokes of similar cross section of similar nodes; strut members having ends of differentiated cross sections adapted for coupling between the spoke of one node and a corresponding spoke of similar cross section of a similar node; and splice members having ends of differentiated cross sections for coupling similar strut members together longitudinally, whereby the configurational options to be assembled are governed by the shape of the spokes employed.

2. A combination as in claim 1 wherein groups of spokes in predetermined relative orientations of symmetry have similar predetermined cross-sectional shapes limiting them for coupling or connection only to other parts having corresponding predetermined cross-sectional shapes whereby the erection of figures is constrained to predetermined assemblies.

3. A combination as in claim 2 wherein said spokes are oriented to provide a plurality of axes of symmetry, each group of spokes associated with a particular axis of symmetry having corresponding similar cross sections.

4. In a kit of parts for erecting figures, in combination, a universal node comprising a connector in the form of a member having a center, a plurality of spokes lying angularly spaced from each other extending from said center along radii of a sphere, said spokes being oriented to establish predetermined axes of symmetry corresponding to predetermined geometrical shapes that can be erected with a plurality of said nodes at the vertices thereof, groups of spokes in predetermined relative orientations of symmetry having similar predetermined cross-sectional shapes adapting them for coupling or connection only to other parts having corresponding predetermined cross-sectional shapes said spokes being oriented to provide a plurality of axes of symmetry, each group of spokes associated with a particular axis of symmetry having a corresponding similar cross sections, and said groups of spokes comprising groups wherein the spokes in respective groups have cross sectional shapes including, square, rectangular, and triangular shapes identifying them with basic geometric shapes having these configurations, whereby the erection of FIGS. is constrained to predetermined assemblies.

5. A combination as in claim 4 and further including predetermined cross-sectional shapes comprising interfitting sockets and projections.

6. In a kit of parts for erecting figures, in combination, a universal node comprising a connector in the form of a member having a center, a plurality of spokes lying angularly spaced from each other extending from said center along radii of a sphere, said spokes being oriented to establish predetermined axes of symmetry corresponding to predetermined geometrical shapes that can be erected with a plurality of said nodes at the vertices thereof, a plurality of parts each comprising a polygonal shape having means whereby it may be coupled to the end of a spoke on said universal node whereby to erect a space-filling geometric figure, said coupling means comprising interfitting sockets and projections, wherein said sockets and projections have cross-sectional shapes corresponding to a square, rectangle, and triangle.

7. A combination as in claim 6 wherein said parts each comprise a part of the surface of a sphere constituting a spherical polygon, the parts including sufficient different parts that a complete sphere can be erected.

8. A combination as in claim 6 including parts, each of which comprises a warped or saddle polygon having a minimal surface between its bounding edges, whereby a space filling saddle polyhedron may be erected.

9. A combination as in claim 3, wherein the spokes in respective groups have cross-sectional shapes that are selected from shapes having twofold, threefold, fourfold symmetry and multiples thereof.

10. A combination as in claim 5 wherein said sockets and projections have cross-sectional shapes of twofold threefold and fourfold symmetry and multiples thereof.

UNITED STATES PATENT OFFICE
CERTIFICATE OF CORRECTION

Patent No. 3,600,825  Dated Aug. 24, 1971

Inventor(s) PETER J. PEARCE

It is certified that error appears in the above-identified patent and that said Letters Patent are hereby corrected as shown below:

| | | |
|---|---|---|
| Column 1, Line 6, | | Change, "SYNESTURCTICS" to --SYNESTRUCTICS-- |
| | Line 51, | After "resulting" delete "is" and insert therefor --in-- |
| Column 2, Line 64, | | Before "is a partial perspective" delete "FIG. 24" and insert therefor --FIG. 24a-- |
| Column 3, Line 60, | | Change "1 1250 inches" to --1.1250 inches-- |
| Column 4, Line 35, | | After "The universal" change "mode" to --node-- |
| | Line 58, | Change "lower" to --a-- |
| Column 6, Line 38, | | After "octagon, etc. A" change "rectangular" to --regular-- |

Signed and sealed this 25th day of July 1972.

(SEAL)
Attest:

EDWARD M. FLETCHER, JR.
Attesting Officer

ROBERT GOTTSCHALK
Commissioner of Patents